3,669,694
PERCOLATOR COFFEE BASKET AND FILTER ASSEMBLY

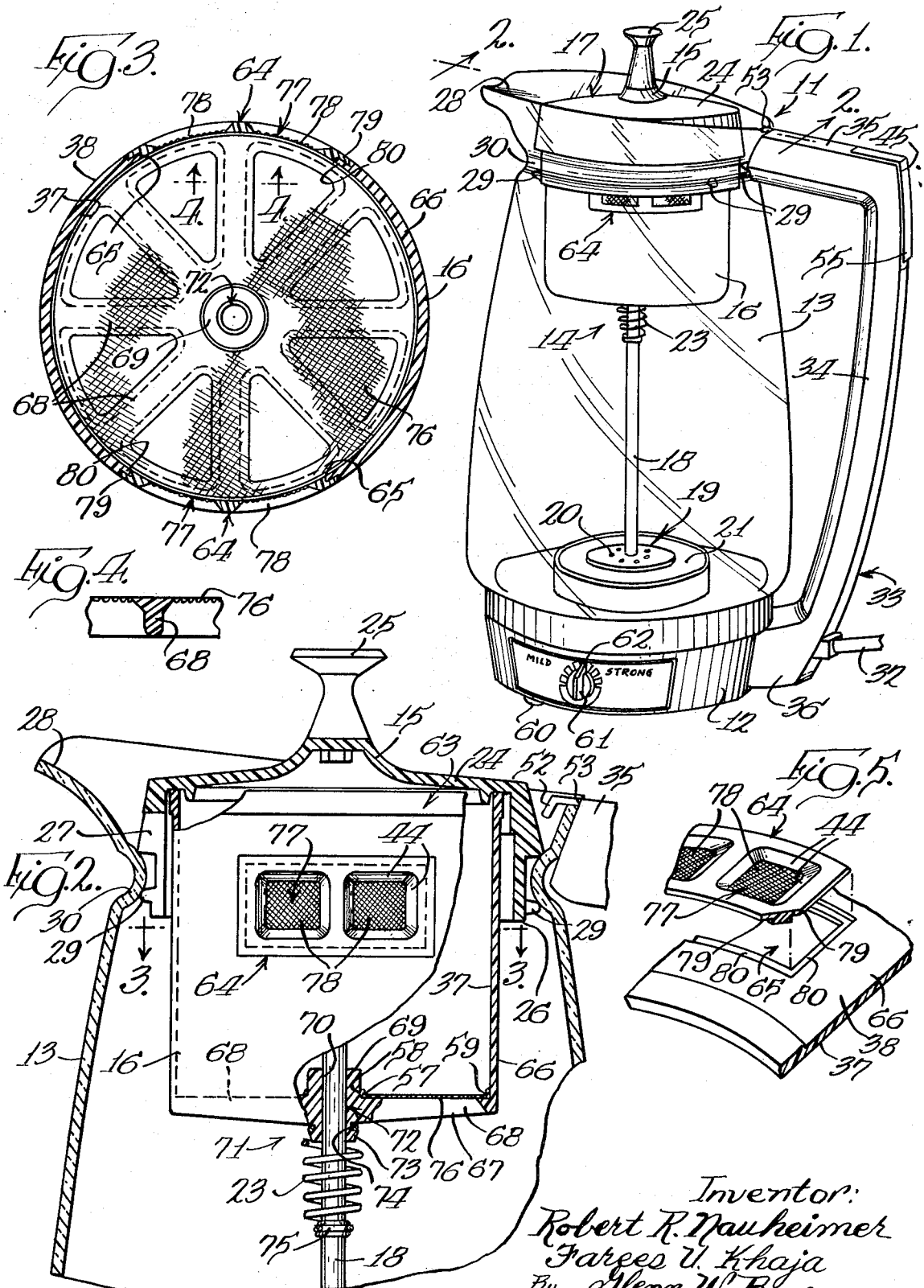

Robert R. Nauheimer, La Grange, and Farees Uddin Khaja, Chicago, Ill., assignors to Sunbeam Corporation, Chicago, Ill.
Filed Mar. 30, 1971, Ser. No. 129,408
Int. Cl. A47j 31/08
U.S. Cl. 99—310             6 Claims

ABSTRACT OF THE DISCLOSURE

A cylindrical unitary brewing basket and filter assembly for electric coffee percolators is formed with a plastic basket and woven mesh filters. The top of the brewing basket is open, and the bottom of the basket has a number of ribs which extend outwardly from the center of the basket in spoke-like fashion. A woven mesh filter is secured against the upper surface of the spoke-like ribs in the interior of the basket. Openings are formed in the upper portion of the side wall of the plastic basket to receive plastic frames which contain overflow openings. Woven mesh filter strips are secured across the inside surface of the overflow openings of each of the frames.

BACKGROUND OF THE INVENTION

The popularity of the percolator-type coffeemaker has increased substantially during the past 20 years or so. Percolator-type coffeemakers have been made of stainless steel, aluminum, chromium plated brass and glass. The glass vessel coffeemaker is preferred by many consumers because of the cleanliness associated with glass vessels and also the feeling on the part of the public that the glass vessels would have no effect on the taste of the coffee. Whether or not metallic vessels affect the taste of coffee is by no means of certainty, but it is known that many consumers prefer glass percolators because they believe that there is such an effect. However, since this preference is to a large extent emotional, it is important that electric glass percolators function as well as the corresponding metallic vessel percolator and also that they sell at approximately the same price range.

It is conventional in percolator-type coffeemakers to employ a pump assembly which extends into a metallic well so as to operate the pump. An example of such a coffeemaker is shown in the patent application entitled "Electric Coffee Percolator," of John J. Unger, Robert J. Augustine and Farees U. Khaja, filed on June 30, 1970, and assigned to the assignee of the present invention. In this type of assembly, the water which is pumped through the pump assembly flows upwardly through a tube into the basket which is supported on the upper end of the tube. The brewing basket is biased upwardly by a spring which is inserted between projections on the bottom of the basket and on the tube so as to force the basket into engagement with the cover. The brewing basket for coffee percolators is conventionally constructed of a metal such as stainless steel or aluminum.

There is a tendency of many users of the percolator to overload the coffee basket with coffee, and this restricts the draining action of the basket, since the coffee grounds become very compacted, and, as a consequence, the water and coffee liquid does not drain through the grounds as fast as desired when water is pumped into the basket. As a result, a pressure builds up which must be relieved. When metallic baskets are used, one manner of relieving is to provide many holes all over the bottom and around the sides of the basket. The holes are of such a size that they restrict the passage of large coffee grounds through them, but, of course, grounds of a smaller size than the holes will pass through these holes unless a filter is placed over the holes. A conventional method of employing a filter is to insert a disposable cup-shaped paper filter into the basket which runs around the entire inner surface of the cylindrical walls.

Metallic baskets have several other disadvantages over baskets made of a plastic material. One of these is that the metallic basket would be much hotter to the touch when it is removed from the coffeemaker, and the user would be more subject to feeling pain when he touches the basket, and he may possibly even receive a burn. In addition, the plastic basket will emphasize the clean, non-metallic appearance of the coffeemaker, and it may be colored to be aesthetically appealing and clean looking without the use of paint which would be subject to chipping and possible contamination of the coffee.

Nylon filters have been employed as filters for filtering coffee in previous coffeemakers. It has been found that polyester screens are to be preferred over nylon screens because nylon has a tendency to stretch which results in filter screens which are not taut. By contrast, polyester screens will remain taut over much longer periods of time. The polyester mesh filter, as previously mentioned, will also provide much better filtering of the coffee grounds than is possible with a metallic coffee basket containing perforated holes which of necessity cannot be feasibly made as small as the holes of a mesh filter.

The plastic brewing basket and filter assembly of the present invention possesses several advantages over conventional metal baskets, molded plastic baskets with molded-in holes and metal baskets with woven plastic screen liners.

First, the brewing basket and filter assembly of the present invention has integrally molded woven cloth filters which have much smaller holes than may be practically provided in metal baskets. The brewing basket disclosed herein thereby allows for retention of the small grounds or "fines" that would normally pass through the holes in a metal basket.

There is a practical limitation to the number of holes and the size of the holes that can be incorporated into a molded plastic basket having molded-in holes. Because of this, the draining ability of such a basket is limited. Very often, a plastic basket having molded-in holes will perform worse than a conventional metal basket with respect to liquid draining ability.

Molded plastic liners which have an integrally molded woven cloth filter are now commercially available as an accessory for metal coffee baskets. The cost of a metal basket plus the molded plastic liner is, however, relatively high.

The plastic coffee basket and filter assembly of the present invention is, by contrast, of a unitary construction. The basket does not require special support provisions for supporting a molded plastic liner. In addition, the present coffee basket and filter assembly provide an improved filtering action in retaining the large particle grounds and the small particle fines within the basket. The absence of grounds or fines in the coffee liquid permits a longer period of time during which the coffee may be kept warm without flavor deterioration. Significant cost savings may be achieved with the present plastic basket over the cost of a stainless steel basket.

In addition, the overflow that may occur in a coffee percolator generally varies with the wattage of the percolator. Thus brewing baskets may be produced in accordance with the present invention which have overflow filters of a size that conforms to the overflow rate of the percolator in which it is used. The filters over the overflow openings of the brewing basket prevents coffee grounds from falling into the pump area and clogging the pump. Moreover, separate integral molding of the filter screens and the window frames presents a much cleaner appearance than would be obtained merely by adhering the filter screens across overflow apertures in the side wall of the basket.

BRIEF DESCRIPTION OF THE DRAWINGS

For a better understanding of the present invention, reference may be had to the accompanying drawings in which:

FIG. 1 is a front perspective view of an electric percolator which may utilize the percolator brewing basket of the present invention;

FIG. 2 is an enlarged fragmentary sectional view of the upper portion of the electric percolator and the brewing basket of FIG. 1 along the line 2—2 of FIG. 1;

FIG. 3 is a top sectional view looking down into the interior of the brewing basket along the line 3—3 of FIG. 2;

FIG. 4 is sectional view of one of the spoke-like ribs of the coffee basket along the line 4—4 of FIG. 3; and FIG. 5 is a fragmentary side sectional view of an overflow opening in a frame and of the associated opening in the brewing basket which receives the frame.

TECHNICAL DESCRIPTION OF THE INVENTION

Referring to the drawings, there is shown in FIG. 1 a perspective view of a glass vessel percolator which may utilize the brewing basket of the present invention and which is designated generally by reference numeral 11. The percolator brewing basket of the present invention may be employed in coffeemakers other than that described herein. A more complete description of the percolator-type coffeemaker shown herein may be obtained by reference to the previously-mentioned patent application of John J. Unger, Robert J. Augustine and Farees U. Khaja. The percolator 11 includes a base assembly 12, a glass vessel 13, a pump and basket assembly 14 and a cover 15. The pump 19 is of a conventional design and is employed to pump the water upwardly through a tube 18 into the basket 16 where the brewing occurs. The pump 19 is positioned at the lower end of the tube 18, and it includes a check valve 20.

The pump 19 is contained within a pump well 21 which is of a generally hemispherical configuration and which is heated so that, as water which is contained in vessel 13 flows into the pump well 21 through the check valve 20 of the pump, it is heated. When the water within the well begins to boil, it passes upwardly through the tube into the plastic brewing basket 16 where the brewing takes place. The cover 15 engages the top of the basket 16, and a helical spring 23, which is positioned immediately below the basket 16, biases the tube 18 downwardly into seated engagement with the pump well 21.

The cover 15 comprises an inverted cup-shaped member having a more or less flat top wall 24 to which a knob 25 is attached. Extending downwardly from the outer periphery of the top wall 24 is a side wall 26 which is continuous around the entire periphery of the cover 15, except for a pouring slot 27. The pouring slot 27 is approximately an inch wide, and it is adapted to be positioned adjacent the pouring spout 28 which is formed in the top of the side wall of the glass vessel 13. The slot 27 permits coffee to be poured from the vessel 13 while the pump and the basket assembly 14 and the cover 15 are retained in the vessel 13. The cover 15 is also provided with protuberances 29 which engage under an annular shoulder 30 that is formed in the glass vessel 13 and extends around the mouth of the vessel 13. The protuberances 29 extend outwardly sufficiently far that there is a slight interference between protuberances 29 and the shoulder 30 when the cover 15 is inserted downwardly into the mouth 17 of the vessel 13.

The pouring slot 27 which extends through the side wall 26 has a secondary function in that it provides a clearance so that the side walls 26 may flex inwardly thereby permitting the protuberances 29 to move downwardly below the annular shoulder 30 in order to lock the cover 15 in position. The protuberances 29 thus provide a detent type of action whereby the cover 15 is locked into assembled relationship with the vessel 13. However, the cover 15 may also be removed easily merely by grasping the knob 25 and by pulling upwardly until the protuberances 29 slide over the shoulder 30 in the vessel 13.

The handle 33 is somewhat U-shaped, and it has a supporting portion 36 and an elongated gripping portion 34 which has a latching assembly (not shown) at the upper portion 35 of the handle 33 which retains the vessel 13 in assembled relationship with the base assembly 12. The power cord 32 plugs into terminal pins (not shown) in the supporting portion 36 of the handle 33. The structure of the latch assembly is not essential to the present invention and is not described in detail herein. However, reference may be made to the aforementioned John J. Unger et al. patent application for a detailed description of the latter assembly. The purpose of the latch assembly is to force the hook 52 downwardly into engagement with a slight step or depression 53 on the upper edge of the vessel 13. The hook 52 has a suitable resilient plastic coating which prevents chipping or damage of the upper edge of the glass vessel 13.

The lever 45 is adapted to operate the latch assembly. The lever 45 is pivotally secured in the handle 33, and lifting of the downwardly extending manual actuating portion 55 of the lever 45 causes the lever to pivot upwardly to a position in which the actuating portion 55 is almost horizontal. In this position, the hook 52 is released from engagement with the step 53 thereby decoupling the handle 33 from the glass vessel 13.

The coffeemaker 11 is supported on the integrally molded feet 60 which extend down from the base 12. The base 12 encloses a heating structure (not shown) which is used for heating water in the pump well 21. A suitable heating arrangement is described in the previously mentioned John J. Unger et al. application. The control elements for controlling the heating element are also housed by the base 12. A control knob 61 is mounted on a control shaft (not shown) which extends into the interior of the base 12 and is connected in operable relationship with the control elements for the heater. Suitable indicia 62 are provided on the outer wall of the base 12 which are used in conjunction with the knob for setting the thermostat assembly to a desired setting.

As is conventional, the basket 16 is of generally cylindrical shape so as to provide maximum capacity and occupy a minimum of space within the mouth of the vessel 13. The basket 16 is formed with a cylindrical side wall 66 which defines a top opening 63 through which coffee grounds may be poured into the basket for brewing purposes. A bottom or base 67 of the basket 16 is formed by a plurality of spoke-like ribs 68 which extend outwardly from a central hub 69 and which connect at their outer ends to the lower edge of side wall 66.

In order to support the basket 16 and to deliver liquid from the pump 19 to the basket, the tube 18 extends through the bottom 67 of the basket and is supported thereon. Thus, the hub 69 is formed with an opening 70 through which tube 18 extends into the interior of the basket with the end of the tube positioned close to the top opening 63 in basket 16 as is conventional.

The above-described spring 23 is connected to the basket 16 by means of a hub 71 which extends downwardly from hub 69 and is coaxial therewith. The hub 71 is provided with an annular lip 73 which defines an annular groove 74 in which the upper end turn of spring 23 is received. Similarly, the lower end turn of spring 23 is received in an annular groove 75 formed in the tube 18.

The spring 23 thus secures the basket 16 and tube 18 in assembled relation and serves to bias the pump 19 in seated engagement with well 21 when the cover 15 is in its assembled position against the basket 16.

For the purpose of filtering the liquid after it passes through the coffee grounds, a fine mesh filter 76 is positioned across the openings formed by the ribs 68 in the base 67. The filter 76 is preferably formed of a polyester woven cloth preferably having openings of less than 300 microns. The basket including the hub 69, ribs 68 and side wall 66 is assembled to the filter 76 by placing the filter 76 in the mold for the basket so that the filter 76 lies flat against the upper surface of the ribs 68.

To insure against leakage around the filter 76 and to facilitate positioning the filter 76 in the basket mold, the filter 76 is turned upwardly slightly for approximately 1/16 of an inch at 59 adjacent the side wall 66 as is best shown in FIG. 2. Similarly, the central portion of filter 76 is formed with an aperture 58 through which hub 69 extends and in this area, the filter 76 has an upturned flange 57 which surrounds hub 69 and extends axially of the hub for approximately 1/16 of an inch.

Because variations in coffee grounds, in water and other conditions alter the rate at which liquid passes through the coffee grounds and the filter positioned below, it is conventional to provide overflow openings toward the top of the basket side wall so that grounds will not flood over the top of the basket when the filtering is slow. In the instant invention, these overflow openings taken the form of two diametrically positioned openings 65 formed in the side wall 66 of basket 16. Received within these openings 65 are the support frames 64. The frames 64 are preferably formed on the same material as the basket 16, which is preferably a plastic material, that may be joined by ultrasonic welding or by molding. Each of the frames 64 define a pair of generally square overflow openings 78 across which the filter screens 77 are positioned. The filter screens 77 are preferably made of the same material as the filter 76.

The percolator brewing basket 16 of the present invention is preferably constructed of a type of plastic whereby the basket may be formed by injection molding. Suitable plastic material for the basket 16 includes glass-filled polypropylene having approximately 15–20% short fibre glass content.

The two frames 64 that are employed are positioned diametrically opposite one another in the side wall 66 of the coffee basket 16, as shown in FIG. 3. The over flow openings 78 which are located in the upper portion of the basket 16 are approximately only 5/8 of an inch square. Thus, it is evident that the area of the overflow openings 78 and their filter screens 77 is only a small fraction of the total surface area of the side wall 66 of the basket 16. The filter screen 77 is secured to the rear of the generally rectangular-shaped frame 64.

The frames 64 are curved to fit the cylindrical contour of the coffee basket 16 and have a flange 79 around their inside periphery. The openings 65 which receive the frames 64 in the side wall 66 of the basket 16 are provided with stepped shoulders 80 which extend around openings 65 as shown in FIGS. 3 and 5. The flange 79 on a frame 64 engages the flange 80 when the frame 64 is inserted into its respective openings 65. The flange 79 of the frame 64 abuts against the surface of the flange 80, and the flange 79 is then secured to the frame 64 in some appropriate manner, as by ultrasonic welding or molding for example. The overflow openings 78 are surrounded by inwardly slanting inclined plane surfaces 44 which slope towards the center of the opening 78 and which have rounded corners 46 at their ends.

While the present invention has been described by reference to a particular embodiment, it will be apparent to those skilled in the art that numerous other embodiments within the scope of the present invention may be provided.

What is claimed as new and desired to be secured by Letters Patent of the United States is:

1. A unitary plastic brewing basket and filter assembly for a coffee percolator having a vessel for containing said basket, a hot water pump and a hot water tube for supplying water from the pump to the basket, comprising a cylindrical side wall defining an open top portion and having a bottom porton including a central hub with an aperture through which said hot water tube passes and a plurality of spoke-like ribs which extend outwardly from the central hub to the bottom edge of said side wall, said ribs defining first openings therebetween for the flow of coffee liquid through said bottom portion, said cylindrical side wall being formed with at least one second opening in the upper portion of said side wall, each said second opening covering only a small fraction of the total surface area of said side wall, an insertable frame for each said second opening which is formed of the same material as said basket and is shaped to fit into said second opening, each said frame defining a third opening for allowing passage of overflow liquid therethrough, a first mesh filter screen secured across said ribs to filter the coffee liquid as it flows through said first openings and a second mesh filter secured to each said frame for filtering the overflow liquid as it flows through each said third opening.

2. The basket and filter assembly as set forth in claim 1 wherein said first and second mesh filters are formed of the same material and said first mesh filter has a central aperture through which central hub projects.

3. The coffee basket and filter assembly as set forth in claim 2 wherein said coffee basket has two second openings on diametrically opposite sides of said coffee basket and an associated frame is received in each said second opening.

4. The coffee basket and filter assembly as set forth in claim 3 wherein said first and second mesh filters are formed of the same material and said first mesh filter has a central aperture through which said central hub projects.

5. A unitary plastic brewing basket and filter assembly for a coffee percolator having a vessel for containing said assembly, a cover, a hot water pump and a hot water tube for supplying water from the pump to the basket of said assembly, comprising a generally cup-shaped basket having an open top portion for receiving said cover in sealing engagement with said basket in the vicinity of the top of said basket, a bottom portion of said basket through which said hot water tube passes, said bottom portion defining first openings for the flow of coffee liquid therethrough, said basket further comprising a cylindrical side wall with at least one second opening provided in said side wall, an insertable frame for each said second openings which is shaped to fit into its associated second opening, each said frame having at least one third opening therein for allowing passage of overflow liquid therethrough, a first mesh filter screen secured across said first openings to filter the coffee liquid as it flows downwardly from said basket through said first openings and a second mesh filter secured to each said frame for filtering the overflow liquid as it flows through each said third opening.

6. The coffee basket and filter assembly as set forth in claim 5 wherein said coffee basket has two second openings on diametrically opposite sides of said coffee basket and an associated frame is received in each said second opening.

References Cited
UNITED STATES PATENTS

| | | | |
|---|---|---|---|
| 3,309,980 | 3/1967 | Bozek | 99—311 |
| 3,333,087 | 7/1967 | Manship | 99—310 |
| 3,592,126 | 7/1971 | Dombrowik | 99—312 |

ROBERT W. JENKINS, Primary Examiner

U.S. Cl. X.R.

210—474